INVENTOR
BERTRAM TREVOR
BY Harry Tonick
ATTORNEY

INVENTOR
BERTRAM TREVOR
BY Harry Tunick
ATTORNEY

INVENTOR
BERTRAM TREVOR
BY Harry Tunick
ATTORNEY

Dec. 29, 1953 B. TREVOR 2,664,509

PULSE MULTIPLEX COMMUNICATION SYSTEM

Filed Jan. 9, 1948 4 Sheets-Sheet 4

INVENTOR
BERTRAM TREVOR
BY Harry Tunick
ATTORNEY

Patented Dec. 29, 1953 2,664,509

UNITED STATES PATENT OFFICE 2,664,509

PULSE MULTIPLEX COMMUNICATION SYSTEM

Bertram Trevor, Riverhead, N. Y., assignor to Radio Corporation of America, a corporation of Delaware Application January 9, 1948, Serial No. 1,331

5 Claims. (Cl. 250—36)

This invention relates to multiplex communication systems, and particularly to such systems utilizing pulses of electrical energy for communication purposes.

It is known in multiplex systems to employ pulses of radio frequency energy which are short compared to the time intervals between them, and wherein the pulse outputs from the different channels are independently modulated for the transmission of independent programs or modulations. The different channels thus carry different messages, and these messages may be speech or telegraph signals. The modulation may be effected by modulating the amplitude, width (duration) or timing of the pulses. Such systems are sometimes referred to as time division multiplex systems because the common transmitting circuit is assigned consecutively to successive channels for equal time intervals.

The pulses in the common transmitting circuit may or may not be short compared to the time intervals between them. It is preferred, though not essential, that the pulses from all the channels occupy only a small percentage of the total time for all conditions of modulation, in order that the common transmitter can furnish a peak power which considerably exceeds the power obtainable in a continuous wave system.

In such systems, the pulse repetition rate may, for example, be 10,000 per second (10 kc.) for each channel. Where an eight channel pulse multiplex system is employed utilizing a synchronizing pulse for each synchronizing period, the overall pulse rate from the system may be 90,000 per second (90 kc.). This number is obtained by assigning 10,000 pulses per second for each of the eight message wave channels and an additional 10,000 pulses per second for synchronization purposes. Ordinarily, the pulse rate is about three times the highest modulation frequency.

An object of the present invention is to provide a more reliable oscillator for particular application in a pulse multiplex system of the foregoing type.

A feature of the invention lies in the transmitter terminal of the system, and comprises the novel crystal-controlled pulse oscillator employing only a single vacuum tube, a pulse transformer and associated circuit components.

A more detailed description of the invention follows, in conjunction with a drawing, wherein.

Figure 1:
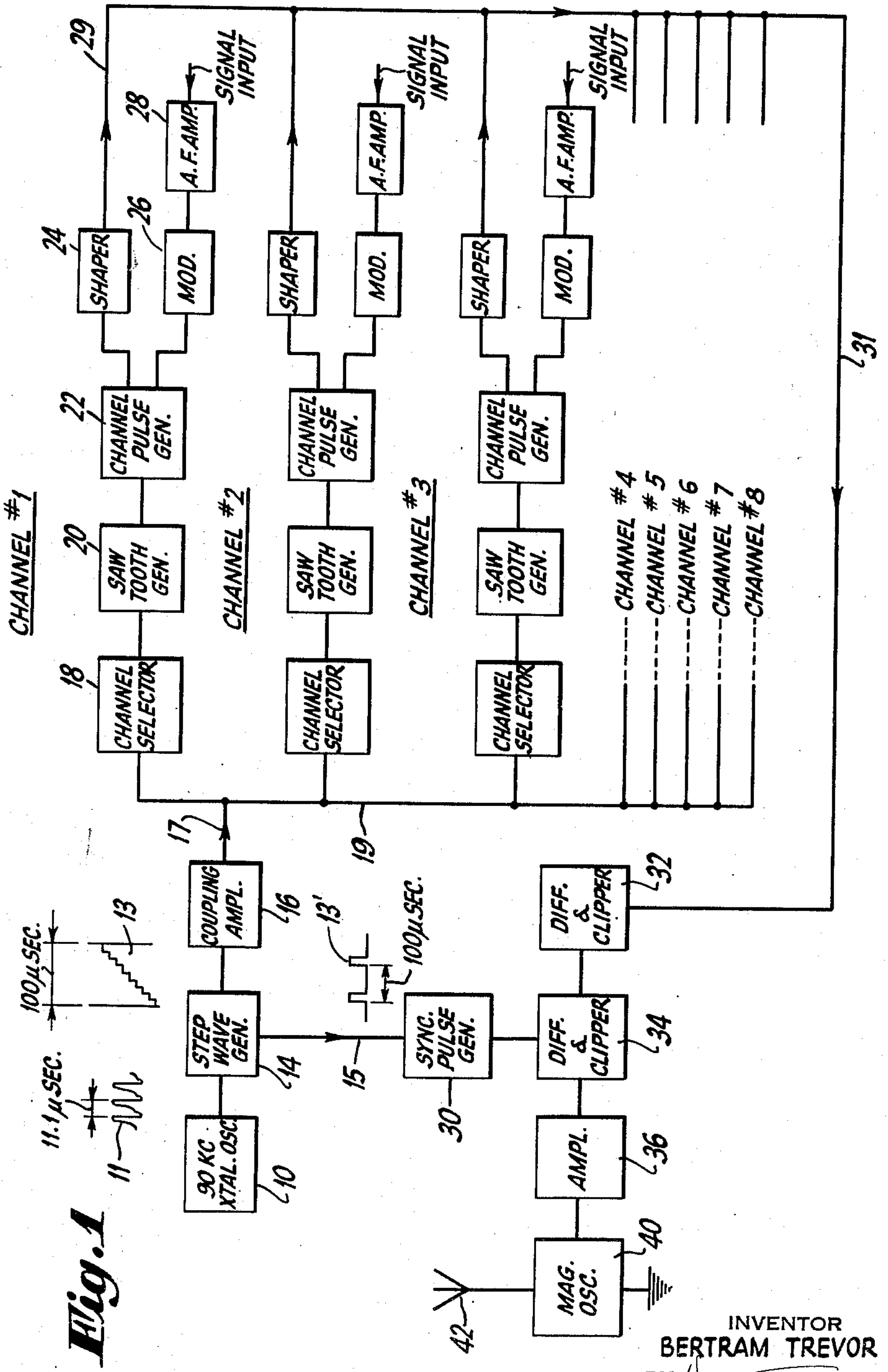
Fig. 1 illustrates, in box form, the essential circuits of the transmitting terminal of the pulse multiplex communication system in which the invention is employed.

Referring to Fig. 1 in more detail, there is shown a modification of the pulse system described in great detail in my copending application Serial No. 733,697, filed on March 10, 1947, now U. S. Patent 2,605,360 issued July 29, 1952, to which reference is made for most of the electrical circuits diagrammatically illustrated by the various boxes. Essentially, this modification lies in the circuit of the 90 kc. crystal-controlled oscillator, which is shown in detail in Fig. 3 herein, and described later in this specification, and which combines the functions of the crystal-oscillator and pulse oscillator in a single vacuum tube circuit.

The transmitter of Fig. 1 will first be described as having eight individual channels. This transmitter utilizes short pulses of radio frequency energy which are time displaced by modulation. For multiplexing purposes, the pulses corresponding to the separate eight channels are separately and consecutively generated at a fixed repetition rate which will be called hereinafter the synchronization rate, corresponding to a fixed time interval to be called the synchronization period. In this transmitting system, the synchronization rate is 10 kc. and the corresponding period 100 μsec. (microseconds). A pulse occurs once each synchronization period for each of the eight channels. The individual rates and periods are consecutively the same and equal to the synchronization rate and period. Each channel pulse occurs at a rate of 10 kc. and the separation between adjacent pulses in each channel for an unmodulated condition is 100 μsec. (microseconds). Because the unmodulated signal pulses are similarly located in each channel, they are, therefore, about 11 microseconds apart in the common output circuit. The pulses in each channel can be modulated ±4 μsec. (peak modulation), thus leaving a guard space between pulses from succeeding channels of about 3.1 μsec. The guard space is necessary to reduce cross-modulation effects. The pulses from other channels occur in the interval between adjacent pulses from any one channel. The synchronization pulse occupies the ninth interval of 11.1 microseconds. The output pulses from the channels are of constant length and the time between two adjacent pulses is measured from the leading edges. The pulses from the channels are equally spaced in the absence of modulation.

In Fig. 1 there is shown a 90 kc. crystal-controlled pulse oscillator 10 producing short pulses of current which are applied to a counter or step-wave generator 14. The voltage wave forms from the apparatuses 10 and 14 are illustrated by the curves 11 and 13, respectively, appearing immediately above the equipment.

The counter 14 provides two outputs, one of which is the step wave 13 which is supplied to the coupling amplifier 16 and the other of which is a synchronization pulse 13' occurring once for each step wave cycle and which is applied via lead 15 to a synchronization pulse generator 30. The function of the step wave 13, which is applied to the coupling amplifier and then to the different channels over lead 17, is to time the mean occurrence of each channel pulse. The output of the coupling amplifier 16 is applied to a connection 19 which is common to all the channels 1 to 8, inclusive.

All channels are substantially identical; and each includes in the order named, a channel selector 18, a saw-tooth generator 20 controlled by the output of the channel selector 18, a pulse generator 22, and an output circuit including a shaper or clipper-limiter 24. The pulses produced by the channel pulse generator 22 are modulated as to time or phase by means of a modulator 26 which is supplied with suitable signals, such as speech, from an audio amplifier 28. All channels have their channel selector inputs connected together in electrically parallel relation.

The channel selectors are differently self-biased and each channel selector is normally biased well beyond the current cut-off condition. The bias of each channel selector is so adjusted that the applied step wave from the coupling amplifier 16 causes current to flow consecutively in the different channel selectors. One channel selector conducts for each rise of voltage in the step wave 13 up to eight, which is the number of channels. Each step rise in the step wave is great enough to insure that during its occurrence the current of the correspondingly biased channel selector shall be driven rapidly from beyond the cut-off condition to a zero bias value. Once a channel selector starts to conduct, the current flow therein will continue until the end of the synchronization period, when the input voltage to the selector drops to zero at the end of the step wave. The outputs from all channels appearing in leads 29 flow in a common lead 31 to differentiator and clipper circuits 32 and 34 from which pulses of shorter duration are applied to a power amplifier 36 whose output controls the production of radio frequency pulses from a magnetron oscillator 40. The very short duration output pulses from magnetron 40 which may each have an effective duration of 0.3 $\mu$sec., are fed to antenna 42, from which they are radiated to the remotely located receiving terminal shown in Fig. 2.

The synchronization pulse generator 30 which receives a pulse over lead 15 from the counter 14 at the end of each step wave, produces a pulse at the end of each step wave which is supplied to the differentiator and clipper 34 and also fed to the amplifier 36 and magnetron 40 together with the channel pulses. There will thus be eight consecutively appearing pulses from the eight different channels followed by a synchronization pulse for each cycle of operations. For the unmodulated condition, all of these channel pulses and the synchronization pulse will be separated from one another by a spacing equivalent to 11.1 $\mu$sec. It will thus be seen that the synchronization period of 100 $\mu$sec. is divided into nine equal intervals by the step counter or step wave generator 14, and that all of these pulses are similarly located in each one of these nine equal intervals and similarly spaced apart for the unmodulated signal condition.

Figure 2:
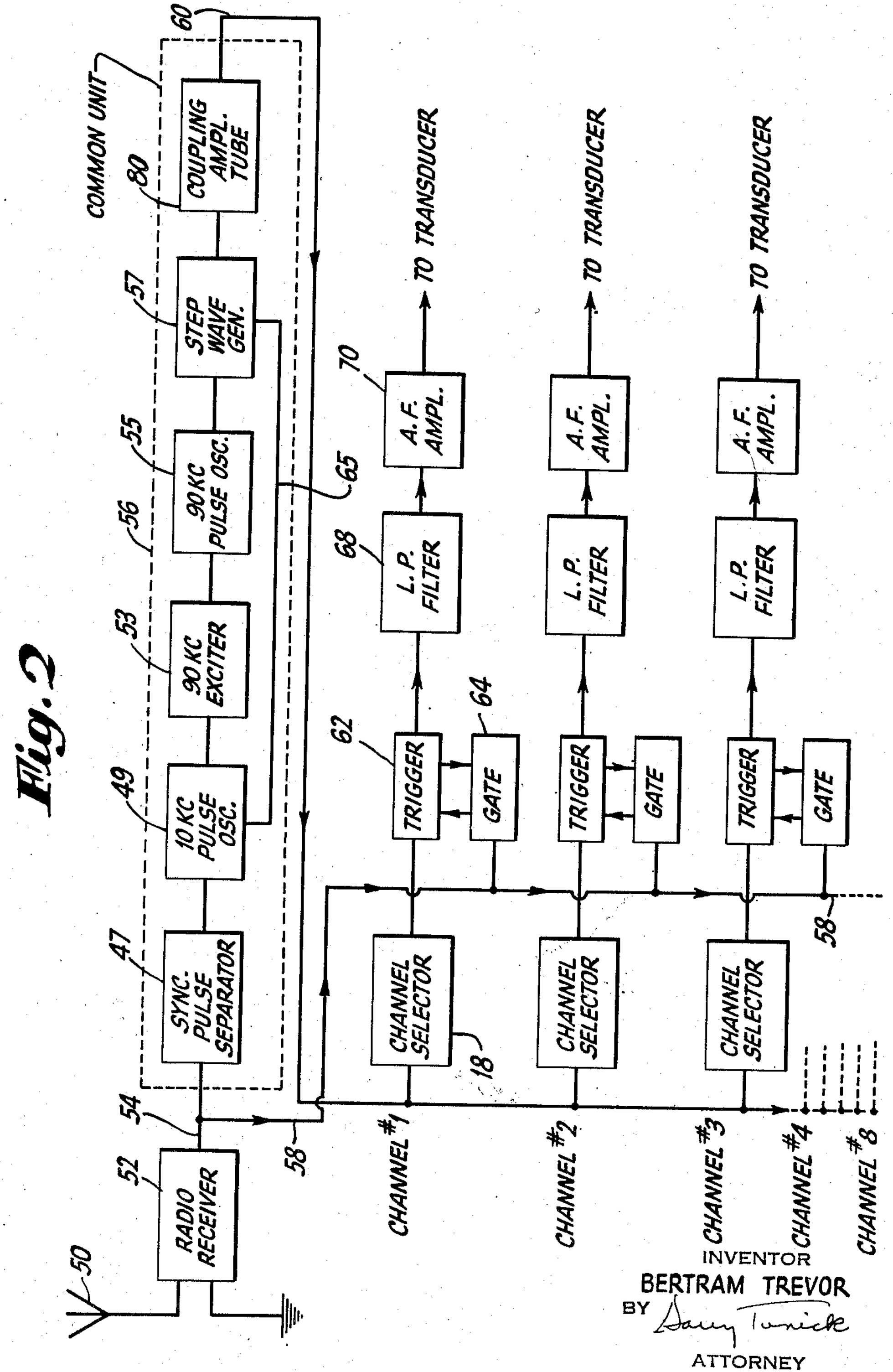
Fig. 2 illustrates, in box form, the essential circuits of the receiving terminal of the pulse multiplex communication system in which the invention is employed.

Fig. 2 illustrates the receiving terminal of the pulse multiplex system for receiving the pulses sent out by the transmitter of Fig. 1 and for reproducing the original modulations. Except for the modification of the present invention, the system is generally similar to that described in my copending application, Serial No. 733,697, now U. S. Patent 2,605,360 issued July 29, 1952, supra, particularly the receiver of Fig. 4 thereof.

Fig. 2 includes an antenna 50 for receiving the radio signals from the remotely located transmitter of Fig. 1, and a superheterodyne receiver 52 upon which the incoming pulses of radio frequency energy are impressed from the antenna. The output of the receiver 52 at lead 54 is in the form of spaced video (direct current) pulses. These video pulses then follow two paths, one path extending to apparatus 56 shown as a box in dash lines, and the other path indicated as lead 58 extending to the gates of all the channels.

Apparatus 56 separates the synchronization pulses from the channel pulses in the output of the superheterodyne receiver 52 and produces from these separated synchronization pulses a new step wave available at lead 60 of desired amplitude and phase relative to the incoming pulses. This new step wave produced by apparatus 56 is similar to the step wave (note graph 13, Fig. 1) at the transmitter of Fig. 1 but is independent of the modulations in the channels. Each rise in this new step wave has a different amplitude and controls a different channel selector in the channels of Fig. 2 in substantially the same manner as described above in connection with Fig. 1.

Figure 4:
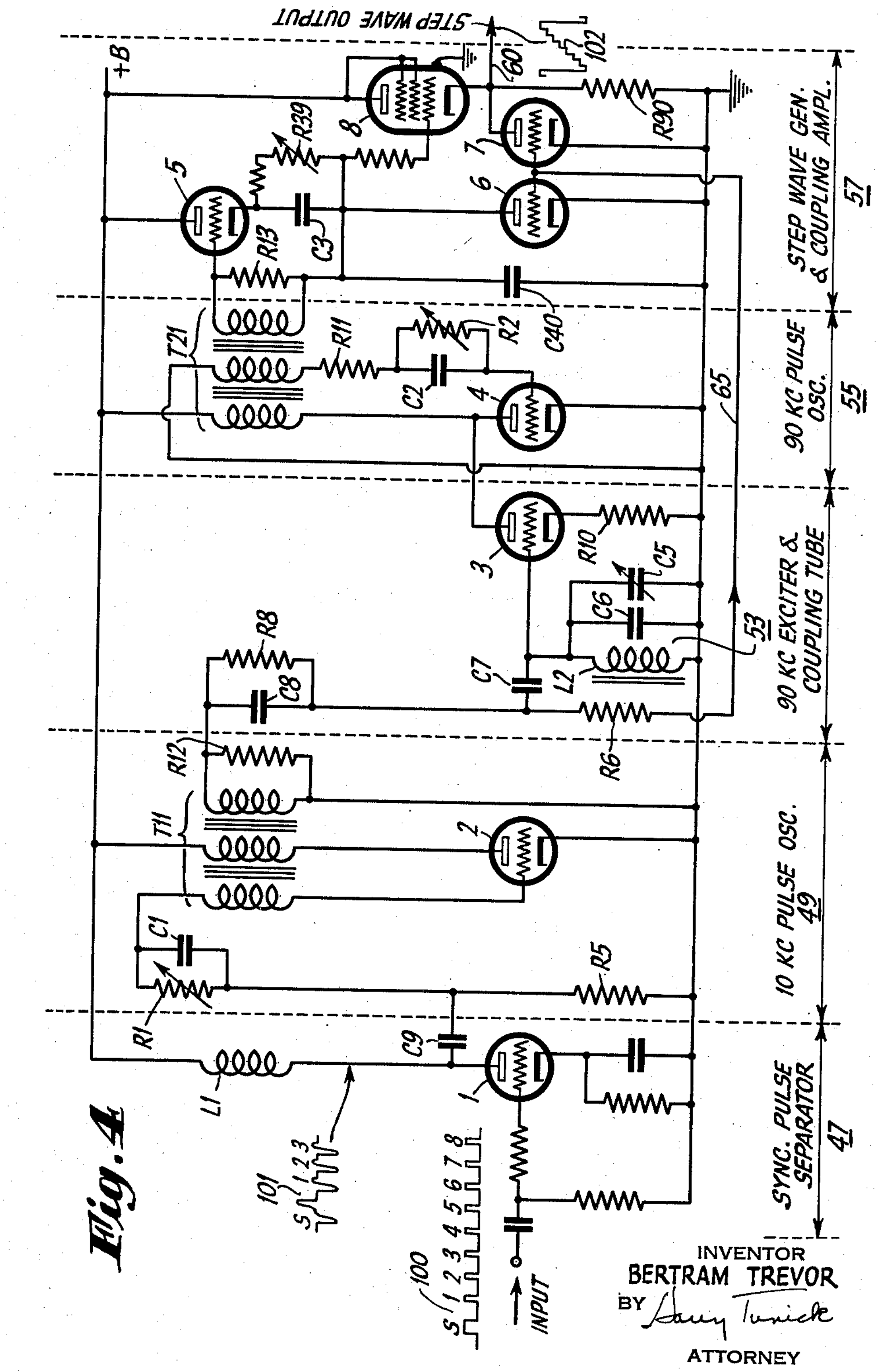
Fig. 4 illustrates the circuit details constituting the invention at the receiving terminal.

Apparatus 56 includes a synchronizing pulse separator 47 which distinguishes between the longer duration synchronizing pulses and the shorter channel pulses. Putting it in other words, separator circuit 47 can be called a pulse selective system which enables the utilization of only the synchronization pulses. The output of separator circuit 47 is a single pulse for each synchronization period (100 microseconds). The circuit of the invention for separator 47 is shown in Fig. 4.

The output of synchronization pulse separator 47 is used to lock a 10 kc. pulse oscillator 49 whose output in turn, excites a 90 kc. exciter 53 in the form of a tuned circuit. The exciter 53 produces a sine wave output of 90 kc. frequency. This 90 kc. sine wave output from box 53 is fed into a 90 kc. pulse oscillator 55 which produces a pulse for each peak of sine wave impressed thereon. Thus, the output from pulse oscillator 55 comprises 90 kc. pulses. These 90 kc. pulses from pulse oscillator 55 are fed to a step wave generator or pulse counter 57 which, in turn, produces a step wave voltage having nine steps or risers. Such a pulse counter may be similar to the one used at the transmitter. The discharge pulse for terminating the step wave is fed to the step wave generator over lead 65 from the 10 kc. oscillator 49.

The step wave voltage in lead 60 (output from apparatus 56) is fed through a coupling vacuum tube 80 and over lead 60 to the inputs of the different channel selectors 18. The coupling tube 80 may be a cathode follower, as described in my copending application, supra. Each channel selector 18 is normally non-conductive and passes current at a particular rise or amplitude in the step wave voltage, dependent upon previous adjustments. The different channel selectors 18, like those in the transmitter of Fig. 1, are biased differently, and the bias is so adjusted that the applied step wave in lead 60 causes current to flow consecutively in the different channel selectors. One channel selector 18 conducts for each rise of voltage in the step wave up to eight, and each rise or step of voltage is great enough to insure that during its occurrence the current of the correspondingly biased channel selector shall be driven rapidly from beyond the cut-off condition to a zero bias value.

The passing of current by a channel selector 18 causes the tripping of its associated trigger circuit 62. Trigger circuit 62 is a flip-flop or unbalanced circuit having one degree of electrical stability. Such trigger circuits are known in the art and may consist of a pair of vacuum tube electrode structures whose grids and anodes are interconnected regeneratively. The trigger circuit has a stable state and an active state. A tripping pulse of suitable polarity serves to trigger off or trip the trigger circuit from its stable to its active state. In the stable state, one electrode structure passes current and other electrode structure is non-conductive. These current passing conditions of the two electrode structures are reversed in the active state.

After the trigger circuit is tripped into the active state, it is restored to its normal or stable state by the gate 64 which is responsive to the video pulse in lead 58 which immediately follows in time the riser at which the channel selector started to conduct. Although the trigger circuit is self-restoring in character, it is given such a time constant that once tripped into the active state, it remains in this active state for a time interval sufficiently long to extend beyond the time in which its channel pulse is expected to arrive. The video pulses in lead 58 are impressed on gates 64 in the different channels, and these gates control the trigger circuits in response to the proper channel pulses. It should be understood that the leading edge of the channel pulse is used to control the trigger circuit 62, whereas the trailing edge of the synchronizing pulse is used in the apparatus 56. The modulation could be taken from either the leading or trailing edges. The output of each trigger circuit 62 is a variable width constant amplitude pulse whose time duration depends upon the time of arrival of the channel pulse. Thus, it will be seen that the time displaced incoming (received) pulses of constant duration have been converted into variable width pulses whose duration (width) corresponds with the time displacement of the incoming pulses. Stated in other words, the incoming pulses of variable occurrence time have been changed to pulses of variable width having the same modulation.

The outputs of the triggers 62 of the different channels are fed to the low pass filters 68. Output from each filter 68 is fed to an audio amplifier 70 and then to a suitable transducer, such as phones or a loudspeaker.

Figure 3:
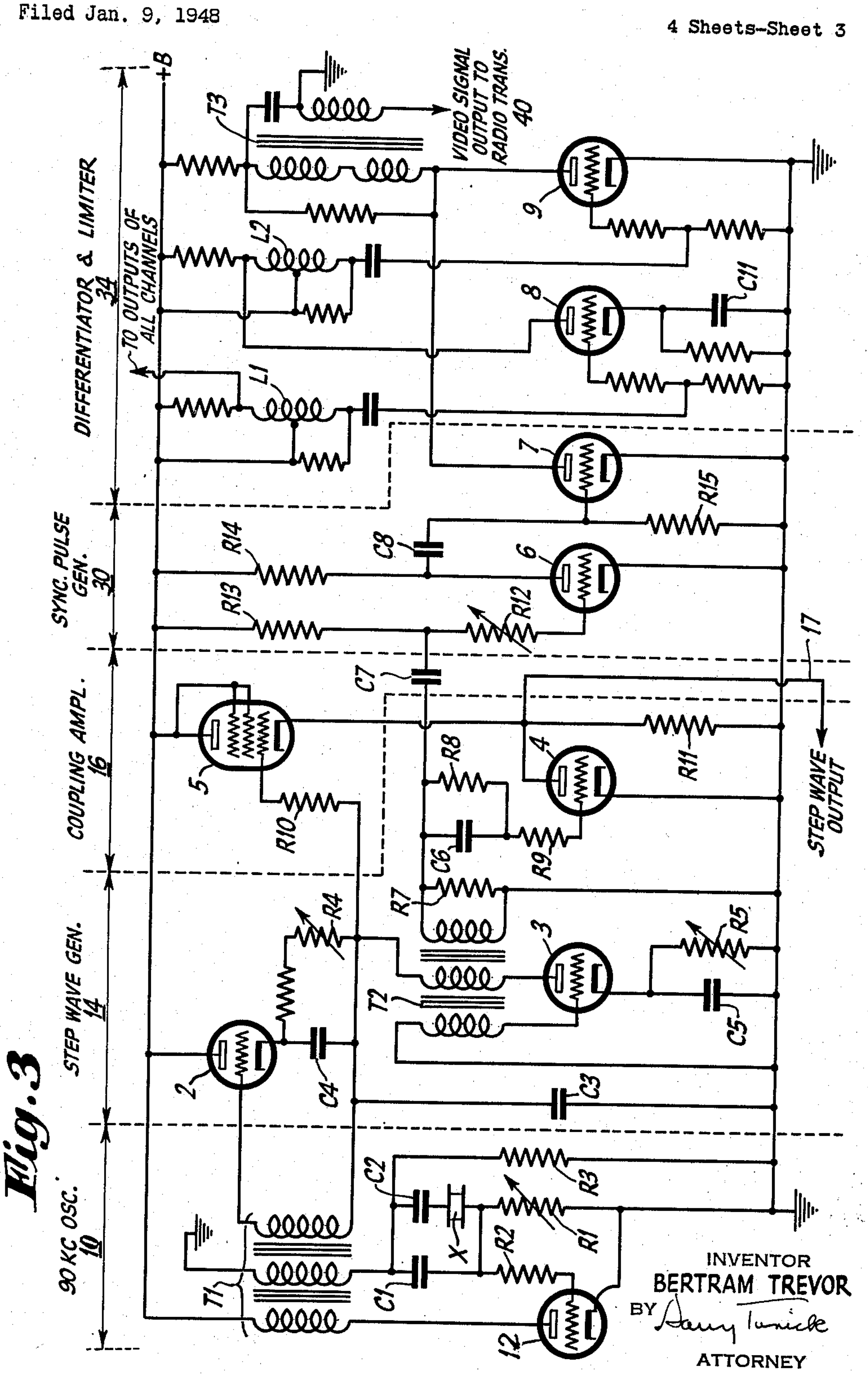
Fig. 3 illustrates the circuit details constituting the invention at the transmitting terminal.

Fig. 3 shows only that portion of the transmitting terminal necessary for an understanding of the invention. In this figure the various circuits which correspond to those shown in boxes in Fig. 1 have been given the same reference numbers.

The 90 kc. crystal-controlled pulse oscillator 10 comprises a triode vacuum tube 12, a three winding pulse transformer T1, capacitors C1, C2, a 90 kc. crystal X, and resistors R1, R2 and R3 so connected as to constitute a free running pulse generator whose pulse rate is locked solidly with the 90 kc. crystal resonant frequency. This oscillator is an improvement over that described in my copending application 733,697, now U. S. Patent 2,605,360 issued July 29, 1952, in that the crystal locks the pulse oscillator without the necessity for extra tubes and circuit components. The pulse rate of this oscillator without the crystal X is determined mainly by the time constant of capacitor C1 and resistor R1 which are selected or adjusted for a pulse rate of slightly less than 90 kc. With the crystal X in position, pulse excitation gives rise to a sinusoidal wave across the crystal terminals which partially overcomes the blocking bias at the grid of triode 12 once for each cycle of the crystal such that the oscillator fires at a time determined by the crystal instead of by the time constant R1, C1. The resistor R3 is a damping resistor.

Pulse output of this 90 kc. oscillator 10 is applied to the step wave generator 14 consisting of tubes 2 and 3, and their associated circuit components. This step wave generator is of the form described in Fig. 4 of my copending application, Serial No. 612,034, filed August 22, 1945, now U. S. Patent 2,592,493 issued April 8, 1952. The step wave amplitude is adjusted by varying resistor R5, and the proper count or number of steps is adjusted by varying resistor R4. Tube 5 is a cathode follower and couples the step wave from the step wave generator to the eight channel units on the lead 17 labelled "Step Wave Output." Tube 3 and its pulse transformer T2 cause the discharge of the step wave and, in so doing, causes a positive going discharge pulse to appear across R7 which is applied to the grid of tube 4 through the self-biasing arrangement consisting of condenser C6 and resistor R8. Tube 4 is normally non-conducting, and serves to improve the discharge speed of the step wave at the cathode of tube 5.

The positive going discharge pulse appearing across resistor R7 is applied to the grid of vacuum tube 6 of the synchronizing pulse generator 30 through coupling capacitor C7 and resistor R12. The grid bias of tube 6 is normally maintained at zero by returning the high resistance grid leak R13 to the +B supply. Capacitor C7 has a relatively small capacitance such that a positive going pulse is limited by grid current in tube 6. The negative overshoot of the discharge pulse is then allowed to cut-off tube 6 as a result of which a positive pulse is generated at its anode during the cut-off condition and which positive pulse is applied to the grid of vacuum tube 7. Tube 7 is normally non-conducting due to the self-bias generated by condenser C8 and resistor R15. The output of tube 7 constitutes a negative going synchronizing pulse whose position in time can be slightly adjusted by means of the adjustable grid resistor R12. This negative going synchronizing pulse, supplied in parallel with the shaped channel pulses, appears at the anode of output tube 9.

The combined (sequentially occurring) positive going output pulses from all eight channel units and which have been time modulated by the signals in the different channel units, are brought into one terminal of the center tapped inductance L1 acting as an auto transformer and pulse shaper circuit. Coil L1 supplies a positive going shaped pulse to the grid of vacuum tube 8 after which they are further shaped and shortened in the coil L2. Coil L2 reverses the polarity and applies the pulses to the grid of the output vacuum tube 9. Output pulse transformer T3 delivers a positive going video signal to the radio transmitter.

The circuits of tubes 6, 7, 8 and 9 are substantially identical with those illustrated in Fig. 2a of my copending application Serial No. 733,697, now U. S. Patent 2,605,360 issued July 29, 1952, supra, and correspond to the circuits of tubes 81, 83, 80 and 81′ of this Fig. 2a of my copending application.

In Fig. 4 is shown the receiving multiplex "common" unit which includes other features of the present invention. This common unit is an improvement over the common unit described in my copending application, Serial No. 733,697, now U. S. Patent 2,605,360 issued July 29, 1952, supra, and illustrated in Figs. 4 and 6a of this copending application and may replace the circuit of Fig. 6a of my copending application. The primary purpose of this common unit is to receive the positive going video signals from the superheterodyne radio receiver, separate the unmodulated synchronizing pulse from the channel pulses, and to utilize the synchronizing pulse to generate the step wave with an adjustable phase and adjustable amplitude. The video signals constituting one frame or cycle, as obtained from the radio receiver 52 of Fig. 2 are shown by waveform 100 and are applied to the grid of tube 1 comprising the synchronizing pulse separator of box 47. The coil L1 in the anode of tube 1 is a differentiator and is damped by means of resistor R5 through blocking condenser C9. Resistor R5 prevents oscillations in coil L1. The output from the anode of tube 1 is a signal like that shown in waveform 101 and is applied through condenser C9 to the free running 10 kc. pulse oscillator 49 comprising vacuum tube 2 and pulse transformer T11. The value of inductance L1 is so chosen that it will differentiate the longer duration synchronizing pulse such that the differentiated impulse resulting from its trailing edge overshoots in a positive direction and has such a magnitude as to lock in the 10 kc. pulse oscillator tube 49 with its associated circuit elements. The shorter duration channel pulses have an overshoot at the anode of tube 1, when differentiated, of such small magnitude that it does not affect the 10 kc. free running pulse oscillator 49.

The output of pulse oscillator tube 2 appears across resistor R12 and is a positive going discharge pulse which immediately follows each synchronizing pulse. This pulse excites the 90 kc. tuned circuit L2, C6, C5 through the small blocking capacitor C7. The 90 kc. slightly damped oscillations appear at the grid of tube 3 which, in turn, couples these oscillations into the 90 kc. free running pulse oscillator tube 4 with its associated pulse transformer T, locking this oscillator solidly at a 90 kc. rate. The 90 kc. pulse output from transformer T appears across R13 to drive the step voltage wave generator 57 comprising tube 5 and its discharge tube 6. This step wave generator is similar to that shown in Fig. 3 of my copending application, Serial No. 612,034, filed April 22, 1945, now U. S. Patent 2,592,493 issued April 8, 1952, with the exception of the omission of a cathode coupled driver stage. Condenser C40 is the charge condenser upon which the step voltage wave is built-up. The positive going discharge pulse is applied directly to the grid of tube 6 over lead 65. Self-bias for the discharge tube 6 is supplied by the combination condenser C8, resistor R8 which maintains tube 6 non-conducting except for the duration of the discharge pulse.

Tube 8 is a cathode follower coupling tube giving a step wave output across its cathode resistor R90. Tube 7 is another discharge tube to speed the collapse of the step wave across resistor R90. The step wave amplitude can be adjusted by varying resistor R39 and the phase of the step wave with respect to the discharge pulse can be varied slightly by the adjustable trimmer capacitor C5. This step wave, which is shown in waveform 102, is fed to the eight receiving multiplex channel units over lead 60.

What is claimed is:

1. A crystal controlled pulse oscillator including an electron discharge system having cathode, control and anode electrodes, a transformer having one winding connected to said anode electrode and another winding connected to said cathode electrode, a series circuit comprising a capacitor and an impedance element capable of passing direct current connected across said other winding, a connection from the junction of said capacitor and said resistor to said control electrode, a further series circuit comprising an element having a capacitive reactance and a piezo-electric device shunted across said capacitor.

2. A crystal controlled pulse oscillator including an electron discharge system having cathode, control and anode electrodes, a transformer having one winding connected to said anode electrode and another winding having one end thereof connected to said cathode electrode, a series circuit comprising a capacitor and a resistor connected across said other winding, a connection capable of passing direct current from the junction of said capacitor and said resistor to said control electrode, a further series circuit comprising an element having a capacitive reactance and a piezo-electric crystal shunted across said capacitor, and a further resistor connected across said other winding, at least one of said resistors being adjustable.

3. In a time division pulse multiplex transmitter, a crystal controlled pulse oscillator including an electron discharge system having cathode, control and anode electrodes, a transformer having one winding connected to said anode electrode, another winding connected to said cathode electrode and a further winding, a series circuit comprising a capacitor and an adjustable resistor connected across said other winding, a resistive connection from the junction of said capacitor and said resistor to said control electrode, a further series circuit comprising a capacitive element and a piezo-electric crystal shunted across said capacitor, a resistance element connected across said other winding of said transformer, and an output circuit connected to said further winding of said transformer.

4. A crystal controlled pulse oscillator including an electron discharge system having cathode, control and anode electrodes, a transformer having one winding connected to said anode electrode and another winding connected to said cathode electrode, a series circuit comprising a capacitor and a resistor connected across said other winding, a connection from the junction of said capacitor and said resistor to said control electrode, said capacitor and said resistor having values at which said oscillator develops full running oscillations slightly lower than the desired frequency, and a further series circuit comprising an element having a capacitive reactance and a piezo-electric crystal shunted across said capacitor, said crystal and said capacitive reactance element having values at which said oscillations are stabilized at said desired frequency.

5. In a time division multiplex pulse communication system having a plurality of individual channels sequentially assigned to a common transmission medium to transmit pulses modulated in accordance with desired intelligence, transmitting apparatus having a frequency stable source of unmodulated pulses of electric energy comprising an electron discharge device having a cathode, a control grid and an anode, a transformer having one winding connected to said anode, another winding connected to said cathode and a further winding, a capacitor and a variable resistor connected across said other winding, another resistor inter-connecting said control grid and the junction between said capacitor and said variable resistor, said capacitor and said variable resistor having values at which the circuit blocks at a rate slightly less than that required to generate the desired pulse frequency, a further circuit comprising a piezo-electric crystal and series capacitive reactance shunted across said capacitor to lock said circuit at said desired pulse frequency, a damping element shunted across said other winding, and an output circuit coupled to said further winding.

BERTRAM TREVOR.

References Cited in the file of this patent

UNITED STATES PATENTS

| Number | Name | Date |
|---|---|---|
| 1,559,116 | Marrison | Oct. 27, 1925 |
| 1,960,419 | Schumacher | May 29, 1934 |
| 2,070,657 | Braaten | Feb. 16, 1937 |
| 2,269,417 | Crosby | Jan. 6, 1942 |
| 2,292,835 | Hepp | Aug. 11, 1942 |
| 2,373,223 | Braaten | Apr. 10, 1945 |
| 2,413,440 | Farrington | Dec. 31, 1946 |
| 2,469,066 | Day | May 3, 1949 |
| 2,480,582 | Houghton | Aug. 30, 1949 |
| 2,493,517 | Applegrath, Jr. | Jan. 3, 1950 |
| 2,495,168 | Houghton | Jan. 17, 1950 |
| 2,526,551 | Gano | Oct. 17, 1950 |